United States Patent
Dooley

(10) Patent No.: US 7,696,657 B2
(45) Date of Patent: Apr. 13, 2010

(54) FAULT MONITORING OF ELECTRIC MACHINES

(75) Inventor: Kevin Allan Dooley, Mississauga (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 898 days.

(21) Appl. No.: 11/419,373

(22) Filed: May 19, 2006

(65) Prior Publication Data

US 2007/0267925 A1 Nov. 22, 2007

(51) Int. Cl.
*H02K 9/00* (2006.01)
(52) U.S. Cl. .................................. 310/52; 310/68 C
(58) Field of Classification Search ............ 310/16, 310/52, 54, 68 C, 323.21; 374/116, 132, 374/148; 475/84, 93, 107
See application file for complete search history.

(56) References Cited

U.S. PATENT DOCUMENTS

| | | | | |
|---|---|---|---|---|
| 4,104,548 A | * | 8/1978 | Borello | 310/14 |
| 4,335,429 A | * | 6/1982 | Kawakatsu | 701/102 |
| 4,373,379 A | | 2/1983 | Obara et al. | |
| 4,753,284 A | | 6/1988 | Krause et al. | |
| 4,849,677 A | * | 7/1989 | Kruger | 318/473 |
| 4,912,343 A | * | 3/1990 | Stuart | 310/14 |
| 5,449,961 A | | 9/1995 | Ludwig et al. | |
| 5,453,930 A | * | 9/1995 | Imaseki et al. | 701/22 |
| 5,478,214 A | | 12/1995 | Howarth et al. | |
| 5,818,177 A | * | 10/1998 | Amiet et al. | 318/135 |
| 6,355,995 B1 | | 3/2002 | Jeppesen | |
| 6,592,486 B1 | * | 7/2003 | Arbanas et al. | 475/84 |
| 6,653,753 B1 | * | 11/2003 | Kawano et al. | 310/14 |
| 6,794,865 B2 | | 9/2004 | Astley et al. | |
| 6,956,315 B2 | * | 10/2005 | Yoon et al. | 310/254 |
| 6,965,183 B2 | | 11/2005 | Dooley | |
| 7,071,584 B2 | * | 7/2006 | Kawano et al. | 310/14 |
| 7,448,981 B2 | * | 11/2008 | Mashiki | 477/3 |
| 2003/0184243 A1 | | 10/2003 | Akatsu | |
| 2004/0145246 A1 | | 7/2004 | Nakano et al. | |
| 2006/0050768 A1 | | 3/2006 | Kriwan et al. | |
| 2006/0134698 A1 | * | 6/2006 | Jin | 435/7.1 |

FOREIGN PATENT DOCUMENTS

JP 2004187443 7/2004

OTHER PUBLICATIONS

European Search Report No. EP 07 25 1999, Aug. 29, 2007.
International Search Report, PCT/CA2007/000598, Aug. 3, 2007.

* cited by examiner

*Primary Examiner*—Thanh-Tam T Le
(74) *Attorney, Agent, or Firm*—Ogilvy Renault LLP

(57) ABSTRACT

A method and apparatus for monitoring an electric machine system, the system having at least two machines or machine channels independently cooled by separate flows of a coolant fluid, the method including comparing coolant properties of the machines to detect a condition(s) of interest in one or more of the machines.

17 Claims, 2 Drawing Sheets

FAULT MONITORING OF ELECTRIC MACHINES

TECHNICAL FIELD

The invention relates to the fault monitoring of electric machines such as electric motors and generators.

BACKGROUND

FIG. 1 shows an example of an electric machine. This particular machine is an electrical motor/generator with permanent magnets. Redundancy in aircraft and other environments is used to increase safety and reliability. In aircraft electrical systems associated with aircraft engines sometimes electric machines are provided with multi-machine redundancies—i.e. two or more machines provided, instead of just one. Alternately, electric machines like the one illustrated in FIG. 1, or other type described in applicants U.S. Pat. No. 6,965,183, for instance, can be designed with two or more substantially independent channels or stator sections, and thus provide an intrinsically redundant design. An advantage of having more than one machine, or more than one channel in a machine, is that in the event of a fault in one machine or channel which requires it to be shutdown the remaining machine(s) or channel(s) can continue to operate.

Various monitoring systems and methods are used for detecting faults in electric machines while they operate. Although these various systems and methods have been satisfactory to a certain degree, there is still a need to provide new and better ways of detecting and possibly preventing faults in electric machines.

SUMMARY

In one aspect, the present invention provides a method of monitoring an electric machine system, the system having at least two machines independently cooled by separate flows of a coolant fluid, the method comprising the steps of: operating the machines; sampling at least one parameter from each of the respective flows of coolant fluid having entered the respective machines, and comparing the sampled values to detect a difference between the sampled values, the difference indicative of the presence of at least one condition of interest in at least one of the machines.

In another aspect, the invention provides a system for monitoring faults in an electric machine, the system having two or more independent machines that are each cooled by a respective coolant flow of a fluid circuit, the system comprising: at least one sensor associated with the coolant fluid circuit of each machine, the sensor adapted to generate a signal indicative of at least one of the temperature, flow rate and pressure of the coolant fluid of the respective flow in each machine; and at least one monitoring unit adapted to receive and compare the signals from each sensor, and to generate a fault signal upon detecting a difference between the signals meeting a relevant threshold condition.

In another aspect, the invention provides an electric machine comprising a rotor and a stator having at least two electric windings and at least two coolant passages, the at least two windings being electrically independent of one another and confined to respective sectors of the stator to thereby be substantially electromagnetically independent of one another, the at least two sectors each having at least one of the at least two coolant passages associated therewith to cool the respective sectors, the machine further comprising an apparatus adapted to measure a relative temperature difference between coolant flowing through the at least two coolant passages, and a monitoring apparatus adapted to monitor said measured difference relative to a reference condition.

BRIEF DESCRIPTION OF THE FIGURES

For a better understanding and to show more clearly how it may be carried into effect, reference will now be made by way of example to the accompanying figures, in which.

DETAILED DESCRIPTION

Figure 1:
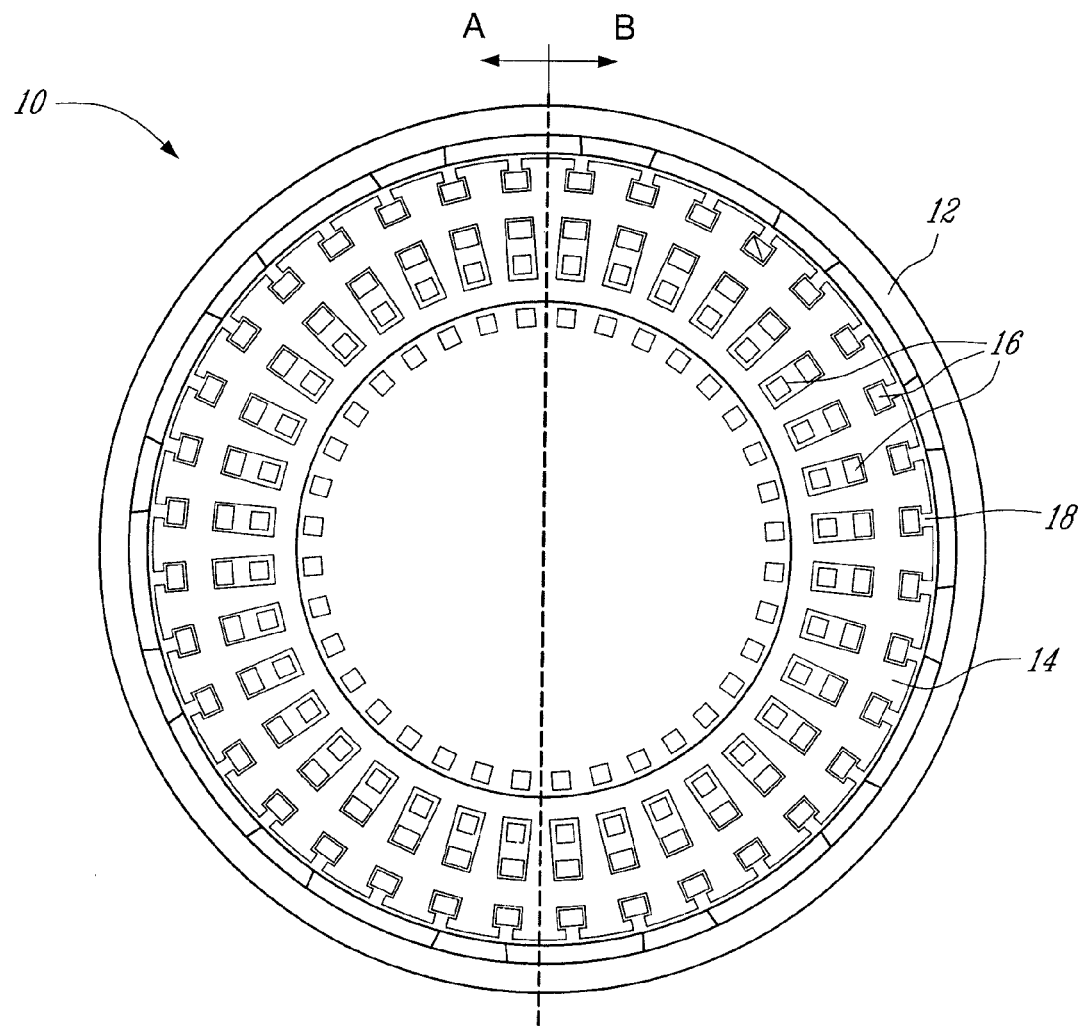
FIG. 1 is a schematic cross-section of view of an example of an electric machine.

As aforesaid, FIG. 1 shows an example of an electric machine 10 of the general type described in U.S. Pat. No. 6,965,183, incorporated herein by reference. Machine 10 has having two independent channel sections, as described therein which in essence provide two separately controllable machines, namely machine A and machine B, within the same stator. Briefly, the machine generally comprises a rotor 12 and a stator 14, with stator windings 16 provided in slots 18 of stator 14. The channels comprise independent sets of windings 16, and thus machine 10 has a two-in-one electric machine design preferably of the type described in U.S. Pat. No. 6,965,183. Machine 10 may operate either as a generator or a motor, or both. The stator 14 and windings 16 of machine 10 are cooled by a coolant fluid such as oil circulating around the various slots, passages and windings therein. Other than the presence of multiple redundant machines or channels and oil cooling, the design of machine 10 is not especially relevant to the system described below, and thus is described no further here. Although the following description illustrates the present system in use with a two-in-one redundant machine design, the present system may be employed with any suitable redundant electric machine arrangement with independent cooling, such as two single-channel machines provided coaxially on the same shaft, or in any other suitable arrangement.

Figure 2:
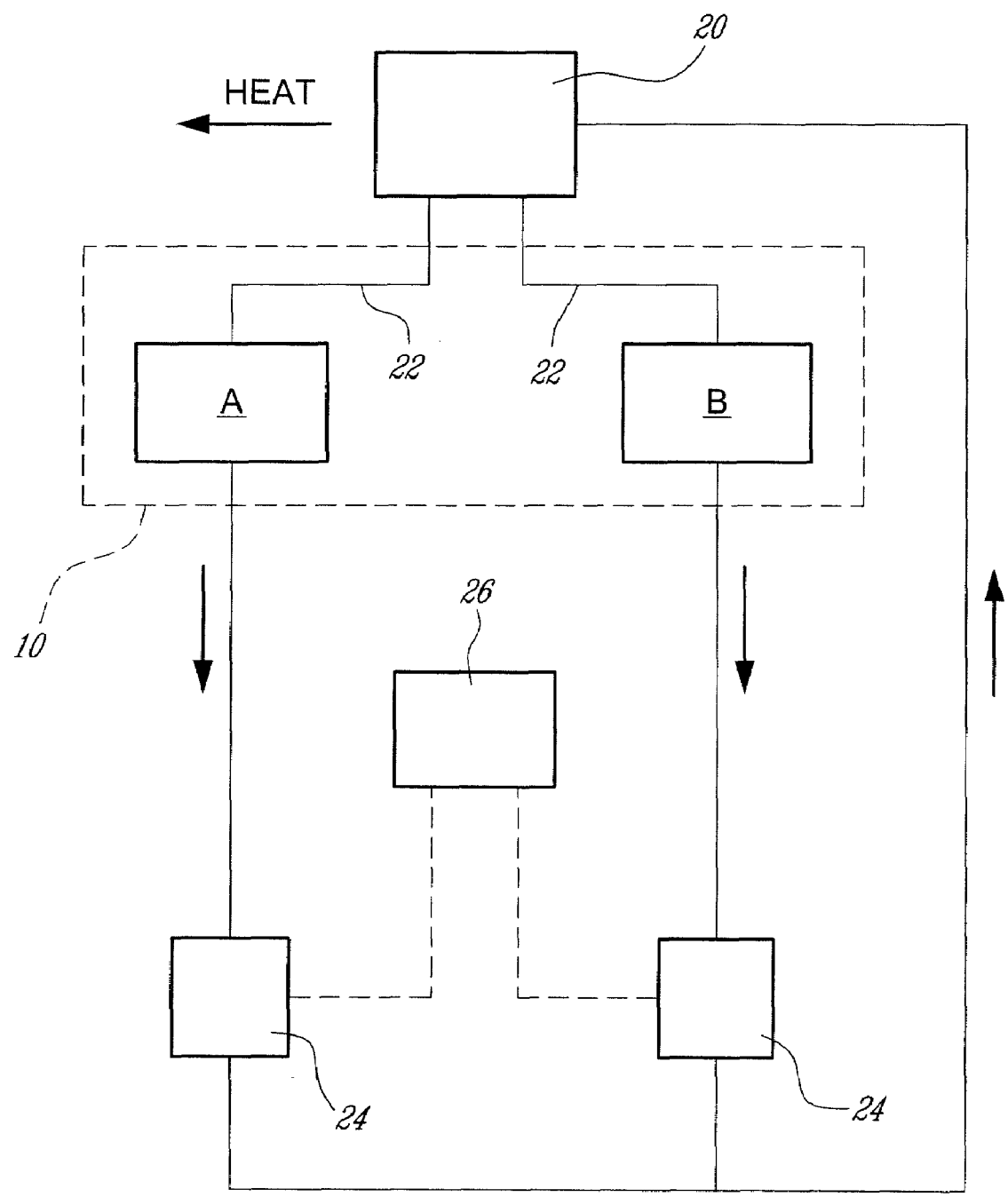
FIG. 2 is a block diagram showing a possible configuration of the fault monitoring system.

FIG. 2 schematically shows an example of a system used for monitoring electric machines such as the one shown in FIG. 1. The electric machine 10, as illustrated, has two channel sections A, B independently cooled by separate parallel flows of coolant fluid supplied by a coolant system 20. The coolant fluid circulates in a network of conduits and chambers provided throughout the electric machine 10 so as to remove the excess heat from the windings and possibly other internal elements. Each section is thus supplied by its own coolant fluid supply line 22. The two coolant flows of machine channels A and B are maintained separately inside the machine 10, and thus each flow preferably has it own inlet to its respective machine or channel, and its own outlet. Both inlets and outlets preferably communicate with the same cooling system, however.

In use, say as a generator, coolant temperature tends to rise as a function of machine power, as more power generated means greater heat generated, meaning more heat is transferred to the coolant. When the machine power levels are set to generally the same settings for each channel or section, any significant difference in temperature or pressure between the coolant fluid at the outlet of the sections A, B may be indicative of a fault or other condition of interest, such as a deterioration condition of some sort. Each channel section A, B is provided with a sensor 24, preferably located at the outlet (but may be located at any suitable location), for measuring selected physical parameters of the coolant fluid, such as its temperature, flow rate and pressure, and the sampled information is sent to a monitoring unit 26. The monitoring unit 26 can be an independent device or be integrated within an existing controller associated with the electric machine 10. For instance, if the electric machine 10 is used in a gas turbine engine, the monitoring unit 26 can be combined into the electronic engine control (EEC). If there is a fault such as a complete or partial short-circuit or possibly a small arc, the coolant fluid temperature would be expected to be abruptly higher in the faulted section than the other one or ones. This higher temperature may be caused by the fact that the efficiency of the faulted section will be lower than a section that is not having a fault. Conversely, a steadily increasing temperature over time may indicate a deterioration in cooling effectiveness, perhaps due to an increasing blockage in the cooling path caused by unwanted particulate in the coolant.

If the monitoring unit 26 detects a temperature difference between two channels or sections, and this temperature difference is above a given threshold, for instance 2 or 3° C. (or whatever may be considered to be significant in the sense that it may be indicative of a condition or problem to be detected), this indicates the presence of a potential fault of which the operator or service team should be notified in a suitable fashion. The monitoring unit 26 can also be used to automatically shut down or signal the controller to modify the operational settings of the machine channel or section in which a problem is suspected (e.g. reduce power output, or shut the channel down, etc.).

If a pressure difference is detected, and that this pressure difference is beyond a given thresholds this may be indicative of an obstruction somewhere in the path of cooling fluid, or other problems. In a similar fashion, the operator or service team can be notified in a suitable fashion. If a flow-rate difference is detected, and that this difference is beyond a given threshold, this may be indicative of a fault, and that the operator or service team should be notified.

As mentioned, the monitoring unit 26 can also monitor the temperature, flow-rate or pressure difference over time so as to detect any potential problem inside the machine 10 using the trend of the difference. Such trend information may also be collected and used to predict the timing and nature of future service events and/or the life of life-limited components.

The coolant fluid used in the machine 10 is preferably oil, however other suitable fluids may be used instead, or as well, including air, depending on the design of the machine 10.

The above description is meant to be exemplary only, and one skilled in the art will recognize that other changes may also be made to the embodiments described without departing from the scope of the invention disclosed as defined by the appended claims. For instance, it is possible to monitor the electric machine(s), while the various machines or channels are not operating at the same power level. The values of the temperature, flow-rates and/or pressures can be normalized, by applying one or more suitable factors, preferably before the comparison of parameters is made. Also, as mentioned the present system is not limited for use with an electric machine as illustrated in FIG. 1, and it can be used with any other suitable design of electric machine, and may be used to monitor two or more separate machines, preferably of similar design, or for which the differences in design may be normalized to permit comparison monitoring of the type described herein. Preferably the machines/channels will have parallel cooling for simplicity of comparison monitoring (not to mention cooling effectiveness), but this is also not necessary. The comparison threshold or thresholds to which the monitoring units refer to do not need to be static values and can be a dynamic value or values, determined in real time or by reference to look-up tables, and can be depending on other parameters, such as the power level of the machine, the running time of the engine, ambient conditions, etc. The reference to the pressure, temperature and flow-rate parameters is meant to be exemplary, and any suitable parameter, such as viscosity, colour, etc. that can be used to determine whether the coolant fluid flows normally or not, and the machine operates normally or not, may be used. Still other modifications will be apparent to the skilled reader, in light of the disclosure above, which do not depart from the principle of the system described in the following claims.

What is claimed is:

1. A method of monitoring electrical faults in an operating electric machine system, the system having at least two electric machines each independently cooled by a separate flow of coolant fluid, the method comprising:
    measuring the coolant temperature from each of the flows of coolant fluid in a respective cooling fluid oath of each electric machine; and
    comparing the coolant temperature measured for each electric machine with the coolant temperature measured for another of the at least two electric machines; and
    detecting a temperature difference between the coolant temperatures, wherein, the temperature difference indicative of the presence of an electrical fault in at least one of the machines.

2. The method as defined in claim 1 wherein the temperature of the respective flows of coolant fluid is measured downstream of a coolant outlet of each machine.

3. The method as defined in claim 1 wherein the temperature of the respective flows of coolant fluid are measured immediately upstream of a coolant outlet of each machine.

4. The method as defined in claim 1 wherein the machines are provided as independently-operable channels within a single stator.

5. The method as defined in claim 1 further comprising determining whether the temperature difference exceeds a threshold value indicative of the electric fault.

6. The method as defined in claim 1 further comprising indicating the presence of the electric fault.

7. The method as defined in claim 1 wherein the electrical fault is due to an internal short circuit.

8. The method as defined in claim 1 further comprising notifying a machine controller.

9. The method as defined in claim 8 wherein the machine controller takes a pre-determined action based on receipt of said notification.

10. The method as defined in claim 1 further comprising setting a "maintenance-required" flag in a machine health log.

11. The method as defined in claim 1, wherein the electric machines are operated at substantially a same power level.

12. The method of claim 1 wherein the electric machines are operated at different power levels, and wherein the method further comprises normalizing the measured temperature to reference conditions prior to comparing the measured temperatures.

13. The method of claim 1 wherein the separate flows of coolant are provided from a common source.

14. A system for monitoring faults in windings of an electric machine, the system having two or more independent machines that are each cooled by a respective coolant flow of a fluid circuit, the system comprising:
    at least one sensor associated with the coolant fluid circuit of each machine, the temperature sensor adapted to generate a signal indicative of a temperature of the coolant fluid of the respective flow in each machine; and at least one monitoring unit adapted to receive and compare the signals from each sensor, and to generate a fault signal upon detecting a difference between the signals meeting a relevant threshold condition.

15. The system as defined in claim 14 wherein the at least one sensor is located downstream of a coolant outlet of each machine.

16. The system as defined in claim 14 wherein at least one sensor is located immediately upstream of a coolant outlet of each machine.

17. The system as defined in claim 14 wherein the machines have independently-operable channels within a single stator or a single machine.

* * * * *